United States Patent
Madan et al.

(10) Patent No.: US 10,055,645 B1
(45) Date of Patent: *Aug. 21, 2018

(54) AUGMENTED REALITY USER INTERFACE FACILITATING FULFILLMENT

(71) Applicant: Amazon Technologies, Inc., Seattle, WA (US)

(72) Inventors: Udit Madan, Seattle, WA (US); Michael Ellsworth Bundy, Seattle, WA (US); David Daniel Glick, Seattle, WA (US); John Elias Darrow, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,524

(22) Filed: Mar. 20, 2017

Related U.S. Application Data

(63) Continuation of application No. 14/227,744, filed on Mar. 27, 2014, now Pat. No. 9,632,313.

(51) Int. Cl.
*G06K 9/00* (2006.01)
*G06F 9/44* (2018.01)
*G06K 19/06* (2006.01)
*G06Q 10/08* (2012.01)
*G06F 9/451* (2018.01)

(52) U.S. Cl.
CPC ....... *G06K 9/00671* (2013.01); *G06F 9/4446* (2013.01); *G06F 9/453* (2018.02); *G06K 19/06028* (2013.01); *G06Q 10/087* (2013.01)

(58) Field of Classification Search
None
See application file for complete search history.

(56) References Cited

U.S. PATENT DOCUMENTS

2010/0121480 A1* 5/2010 Stelzer ............... B65G 1/137
700/215

\* cited by examiner

*Primary Examiner* — Christopher Kohlman
(74) *Attorney, Agent, or Firm* — Thomas Horstemeyer, LLP

(57) ABSTRACT

Disclosed are various implementations for updating information displayed in a user interface for a worker in a fulfillment center. Information changing relative to a previous user interface can be provided in response to location data that indicates the worker's location within a fulfillment center.

20 Claims, 13 Drawing Sheets

AUGMENTED REALITY USER INTERFACE FACILITATING FULFILLMENT

CROSS-REFERENCE TO RELATED APPLICATIONS

This application is a continuation of, and claims priority to, U.S. Patent Application entitled "Augmented Reality User Interface Facilitating Fulfillment" filed on Mar. 27, 2014, and assigned application Ser. No. 14/227,744, which is incorporated herein by reference in its entirety.

BACKGROUND

Items are stored or stocked in distribution or fulfillment centers. Shipments of items can be assembled and fulfilled from distribution or fulfillment centers where the items are stored. Items are retrieved or picked from the inventory storage locations within the fulfillment center by workers and are then packed, and shipped. Items in the inventory in the fulfillment center may be stored in one or more locations within the fulfillment center, either together as a group or separately throughout the fulfillment center. Workers in the fulfillment center are tasked with retrieving items from and/or placing items within the fulfillment center at various locations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating and/or rendering a user interface upon a display of a device that displays information related to various types of tasks. For example, a task can be related to the fulfillment process of electronic commerce orders by personnel or workers in a fulfillment center. Such a task can also be related to delivery of a parcel by a package delivery service. The present disclosure also relates to determining a location of a worker within the fulfillment center, which can facilitate rendering information on a user interface on the display to facilitate a given task. The user interface can be rendered and displayed by a wearable computing device, such as augmented reality glasses, that overlay a user interface over a field of view of a fulfillment center worker.

For example, if a location of a worker within a fulfillment center can be determined, location-specific information, such as, for example, turn-by-turn directions to a destination within the fulfillment center, can be rendered in the user interface. A destination within the fulfillment center can include a particular floor, row, shelf, bin, or a particular item or product that is stocked within the fulfillment center. Accordingly, embodiments of the disclosure can facilitate providing various types of information to a worker in a fulfillment center in a user interface that is rendered by a wearable computing device, where the information is also based at least in part on the location of the user as detected in accordance with embodiments described herein.

Figure 1:
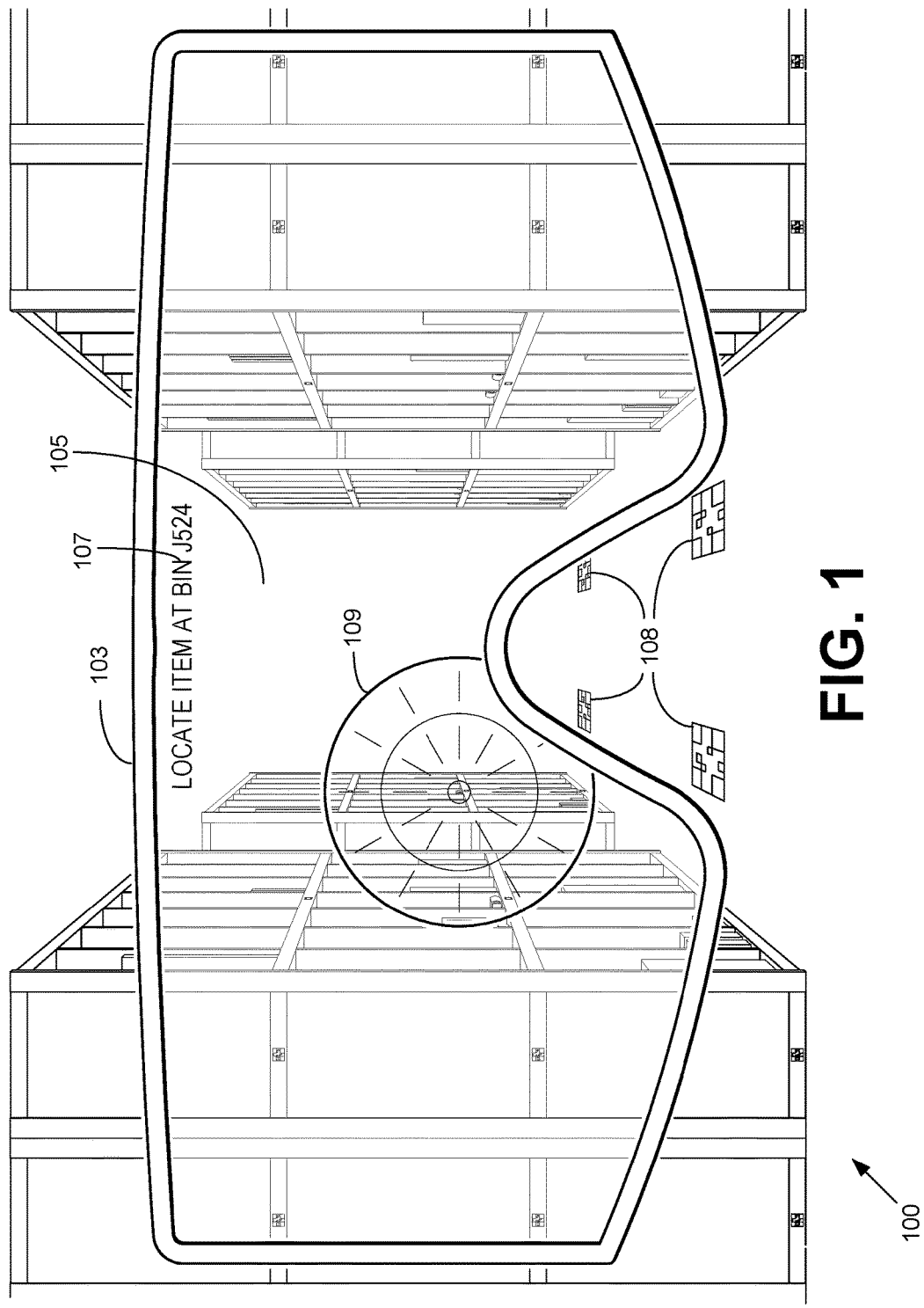
FIG. 1 is a drawing of an example scenario according to various embodiments of the present disclosure.

Beginning with FIG. 1, shown is an example scenario 100 according to various embodiments of the disclosure in which a user interface 105 rendered by a wearable computing device 103, such as augmented reality glasses or any other device in which a user interface 105 is rendered in a field of view of a user, is shown. The user interface 105 can display a worker instruction 107 that is rendered within the field of view of the user. For example, the worker instruction 107 can identify a particular location within a fulfillment center to which a worker should proceed as well as a task to perform at the particular location.

In the depicted scenario, the worker instruction 107 can be generated by the wearable computing device 103 and/or one or more computing devices in communication with the wearable computing device 103. The worker instruction 107 identifies a particular bin in the fulfillment center to which the worker should proceed to retrieve an item or product. The item can be retrieved for the purposes of fulfillment of the item in response to an order placed via an electronic commerce site. The user interface 105 can also include a visual indicator 109 that can provide a visual cue or direction that is overlaid onto the field of view of the user in the user interface 105. Such a visual cue can be provided as a part of turn-by-turn directions to a destination within the fulfillment center. In some embodiments, the visual cue can also be overlaid onto the user interface 105 to highlight the location of an item that is within the field of view of the user. For example, if the bin to which the user is directed appears within the field of view, the visual indicator 109 can point to or highlight the bin in the field of view.

The worker instruction 107 may also include specific instructions or actions for the worker to take, such as "remove orange box from shelving unit on the left." In other words, the worker instruction 107 can comprise instructions beyond turn-by-turn directional instructions to a destination in the fulfillment center. For example, a worker instruction 107 can identify a particular item in the fulfillment center that the worker should retrieve. A worker instruction 107 can also include an instruction to place a particular item in a particular location in the fulfillment center. In other words, a worker instruction 107 can include any instruction related to any step of a task conducted by the worker in a fulfillment center.

Such a visual indicator 109 can be updated or redrawn within the field of view of the user as the orientation and/or location of the wearable computing device 103 is updated. In other words, as a user wearing the wearable computing device 103 moves throughout the fulfillment center, the visual indicator 109 can be updated or repositioned on a heads-up display of the wearable computing device 103 to account for the location and orientation of the wearable computing device 103.

The wearable computing device 103 can detect its location within a fulfillment center by detecting location identifiers 108 within the fulfillment center and determining its location within the fulfillment center relative to the location identifiers 108. Such location identifiers 108 can include, for example, barcode indicators, such as two-dimensional or quick response codes (QR codes) that are positioned throughout the fulfillment center such that they are visible within the field of view of a user wearing the wearable computing device 103. In this scenario, the wearable computing device 103 can be configured with one or more image capture devices that are configured to capture imagery within the field of view of a user, and the image capture devices can capture imagery of the user's field of view periodically. A numeric or alphanumeric identifier associated with such a barcode indicator can be uniquely associated with a particular location within the fulfillment center such that, when scanned by the wearable computing device, the wearable computing device can identify a particular location within the fulfillment center.

To this end, the wearable computing device 103 can then be configured with a barcode scanner, image capture devices, a radio frequency identification (RFID) scanner, a near field communication (NFC) scanner, Bluetooth radio, or any other device that can capture information from a barcode, NFC tag, RFID tag, location beacon, or other type of identifier that can be placed within a fulfillment center. In one embodiment, location identifiers 108 can be positioned along the floor or other surfaces of a fulfillment center (e.g., shelves, bins, etc.).

The depicted user interface can be facilitated by embodiments of the disclosure. In the example of FIG. 1, the user interface 105 displays structured information that can be rendered upon the display of a wearable computing device 103 worn by a user or worker in a fulfillment center in order to facilitate fulfillment of orders or other tasks in the fulfillment center by providing the worker with information about a particular task, such as the retrieving or stowing of items that are stocked in the fulfillment center.

In the example scenario 100 shown in FIG. 1, the wearable computing device 103 can capture a representation of the location identifier 108, such as a numerical or alphanumerical representation of a two-dimensional barcode, an RFID tag, an NFC tag, etc., and communicate the representation of the location identifier 108 to another computing device, which can be carried by a worker or affixed to a cart being pushed by the worker through the fulfillment center. In some embodiments, the capture device 103 can transmit the representation of the location identifier 108 to a fulfillment application executed by a computing environment via a network. In response to capturing a location identifier 108, the user interface rendered upon the display of the wearable computing device 103 can be updated in response to the changing location of the wearable computing device 103. In other words, as the worker moves throughout the fulfillment center, information about a task being performed by or assigned to the worker can be provided in the user interface rendered by the wearable computing device 103 based upon the cart's location and/or a step in a task being performed by the worker.

The user interface 105 can also be updated in response to the changing orientation of the wearable computing device 103. Because the wearable computing device 103 can take the form of augmented reality glasses that are worn on the user's head and in which the user interface 105 is rendered upon one or more lenses of the augmented reality glasses, it may be the case that the visual indicator 109 requires updating as the user moves his or her head while moving through the fulfillment center as well as when the user is standing still within the fulfillment center. Accordingly, the wearable computing device 103 can also be equipped with one or more sensors that can detect movement, acceleration, orientation, and other aspects of the position of the device.

In the example of FIG. 1, the visual indicator 109 comprises a target that indicates the location within the field of view of the user of the particular bin that corresponds to the worker instruction 107 that is also rendered within the user interface 105. The visual indicator 109 can take one form when the user is located outside of a particular proximity radius of the particular bin, and as the user approaches the particular bin, the visual indicator 109 may change as the bin is more visible within the field of view. As will be described herein, the bins within a fulfillment center may also be associated with a barcode identifier or other type or location identifier or location beacon that can be detected by the wearable computing device 103 so that a particular bin can be identified when it is within the field of view of the wearable computing device 103.

Figure 2:
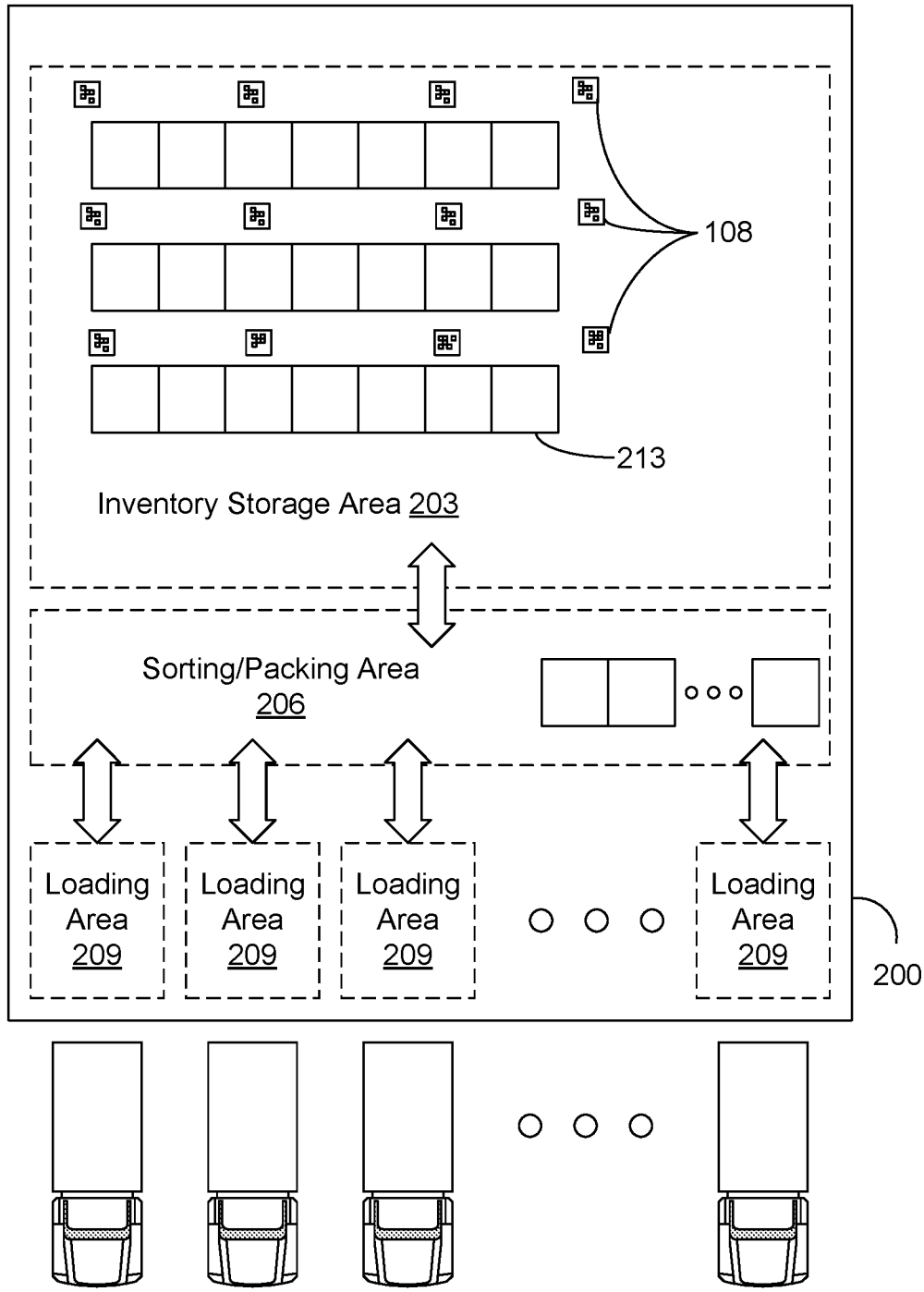
FIG. 2 is a drawing of a fulfillment center according to various embodiments of the present disclosure.

Reference is now made to FIG. 2, which depicts a non-limiting example pictorial diagram of a fulfillment center 200. In the context of the present disclosure, a fulfillment center 200 is any materials handling facility where items are received and stored, orders for items are fulfilled, and/or shipments of items corresponding to orders originate. As such, a fulfillment center 200 may, for example, correspond to a warehouse, a distribution center, a processing center, or a similar structure. A fulfillment center 200 may be divided into multiple sections. For example, a fulfillment center 200 may include one or more inventory storage areas 203, one or more sorting/packing areas 206, and one or more receiving/loading areas 209 where shipments are received into the fulfillment center or loaded onto delivery vehicles for delivery to customers or other recipients pursuant to orders for such items. The fulfillment center 200 may also have one or more mechanisms or methods for moving items between sections, including conveyors, forklifts, robotic handling equipment, and other means. In addition, a fulfillment center 200 may have one or more pickers or other employees who traverse pick routes or other paths generated by a shipment or order fulfillment system or process in order to retrieve items within the fulfillment center 200 for shipment.

The inventory storage area 203 includes one or more item locations 213 where one or more items may be located for long-term or bulk storage. An item location may correspond to any number of physical structures. For example, a shelf, set of shelves, a pallet on a floor, a bin and/or a series of bins, or similar structures may be considered to be an item location 213. Item locations 213 can be arranged in rows within the inventory storage area 203 and/or any other area of the fulfillment center 200.

Items stored or stocked in the fulfillment center 200 include physical goods available for order and shipment from the fulfillment center 200. Items may include, for example, books, compact discs (CDs), digital video discs (DVDs), televisions, cameras, stereo systems, computers, pots, pans, appliances, exercise equipment, power tools, garden tools, furniture, toys, clothes, cosmetics, medicine, medical supplies, jewelry, sporting goods and/or equipment, meat, fruit, vegetables, canned goods, dairy products, and/or other goods or products.

There is no requirement that identical items be stored together at the same or neighboring item locations 213. In some embodiments, it may be more efficient to organize the inventory storage area 203 such that identical or similar items are stored together. For example, all DVD's may be stored in a group or cluster of adjacent item locations 213, with all DVD's corresponding to a particular movie located in a single item location 213. In other embodiments, it may be more efficient to store an item in any item location 213 with sufficient capacity. In such embodiments, multiple instances of the same item may be stored in separate item locations 213 in various locations of the inventory storage area 203. For example, DVD's corresponding to a particular movie may be located in multiple item locations 213 spread throughout the inventory storage area 203 for more efficient accessibility in certain situations or scenarios.

Additionally, in some embodiments, items may be randomly or pseudo-randomly assigned to item locations 213 throughout the fulfillment center 200 based upon availability of space in an item location 213. In other words, a worker and/or robot can stock or stow an item in a given item location 213 if there is space in the item location 213 and then identify to an application or program tasked with tracking inventory the item location 213 in which an item is placed. In some embodiments, identification of an item location 213 in this way can be accomplished by scanning a barcode or other identifier associated with the item location 213 and transmitting an identifier of the item location 213 to the application or program tasked with tracking inventory.

The sorting/packing area 206 is where items are sorted and packed for shipment or received and sorted for storage. Within a sorting/packing area 206, items may be located at item locations 213 according to various embodiments of the present disclosure. Items at item locations 213 within the sorting/packing area 206 may be located such that workers may be able to quickly and efficiently retrieve items for fulfillment or shipments. Generally, as items within the item locations 213 of the sorting/packing area 206 are used to fulfill shipments, items at item locations 213 within the inventory storage area 203 are automatically moved from the inventory storage area 203 to the sorting/packing area 206. The automated movement of items between the inventory storage area 203 and the sorting/packing area 206 may be directed by automated systems or processes that track inventory levels at item locations 213 within the sorting/packing area and dispatch employees or automatons to transfer goods between the item locations 213 within the inventory storage area 203 and the item locations 213 within the sorting/packing area 206. The loading area 209 is where items can be received, shipped from the fulfillment center 200 and/or handed over to a carrier tasked with movement of the items to another location or destination external to the fulfillment center 200.

As noted above, location identifiers 108 can be positioned throughout the various areas of the fulfillment center 200. Location identifiers 108 can uniquely identify a particular location within the fulfillment center 200. A location identifier 108, as noted above, can comprise a two-dimensional barcode, such as a quick response code, that is positioned on the floor of the fulfillment center 200. If implemented as a visual identifier such as a barcode, location identifiers 108 can be sized such that an image capture device mounted on the wearable computing device 103 that is moved through the fulfillment center 200 by a worker can capture a representation of location identifiers 108 as the user moves to various locations.

Location identifiers 108 can be positioned throughout the entire fulfillment center 200 or within certain areas of the fulfillment center 200. In one embodiment, location identifiers 108 can be positioned every few feet, within individual rows in a fulfillment center 200, within aisles linking rows of the fulfillment center 200 to one another, as in any other area of the fulfillment center 200 at which a location identifier 108 is desired. Location identifiers 108 can also take the form of devices that transmit a localized wireless signal or identifier that can be detected by a wireless capability of the wearable computing device 103. Such an identifier can uniquely identify a location within the fulfillment center 200 in the same way that a visible barcode identifier may identify a location within the fulfillment center 200.

Additionally, it should be appreciated that the depicted diagram of a fulfillment center 200 is given for illustrative purposes and that fulfillment centers 200 can vary in size in terms of the number of item locations 213, the number of rows of item locations 213, the number of floors in the fulfillment center 200, the arrangement of item locations 213 and/or rows of item locations 213, and other properties of the fulfillment center 200 as can be appreciated.

Figure 3:
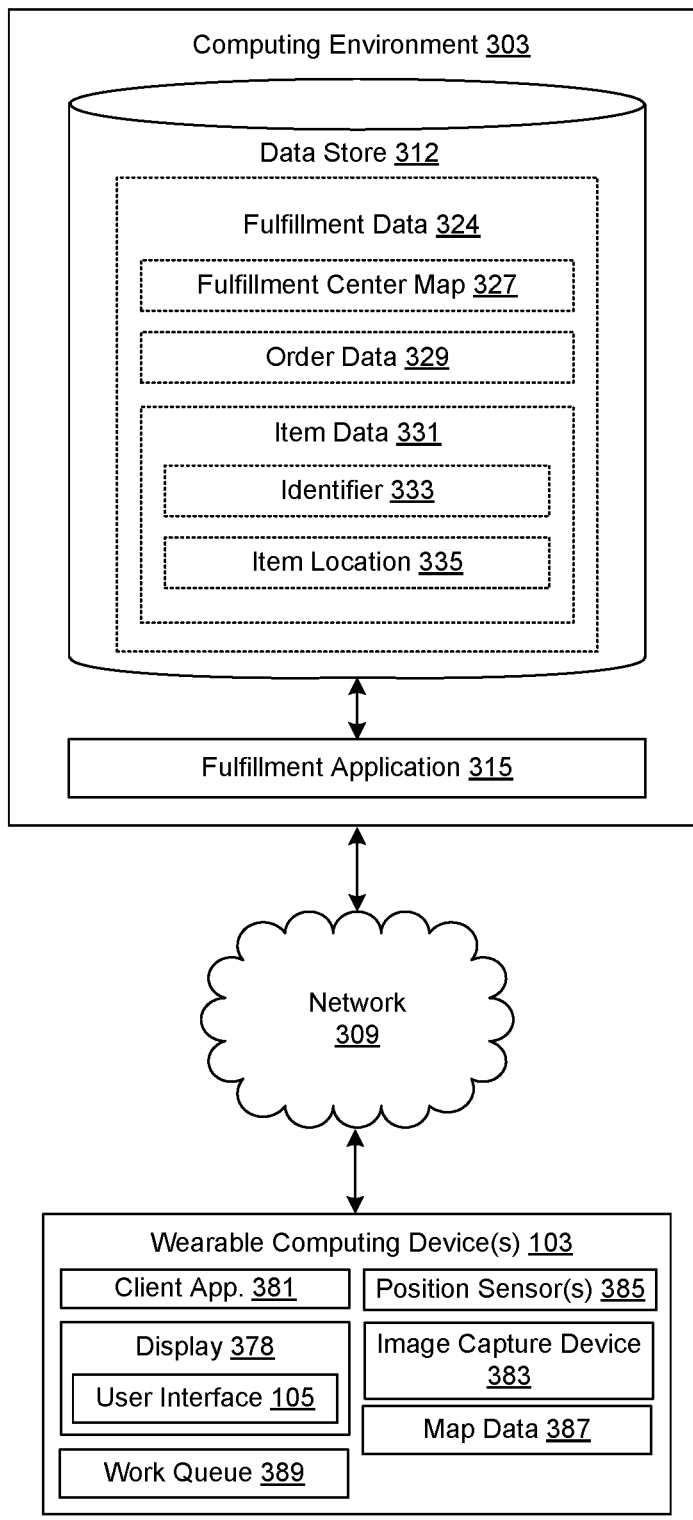
FIG. 3 is a drawing of a networked environment according to various embodiments of the present disclosure.

With reference to FIG. 3, shown is a networked environment 300 according to various implementations. The networked environment 300 includes a computing environment 303 as well as one or more wearable computing devices 103 in data communication via a network 309. The network 309 includes, for example, the Internet, intranets, extranets, wide area networks (WANs), local area networks (LANs), wired networks, wireless networks, or other suitable networks, etc., or any combination of two or more such networks.

The computing environment 303 may comprise, for example, a server computer or any other system providing computing capability. Alternatively, the computing environment 303 may employ a plurality of computing devices that are arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various implementations. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a fulfillment application 315 and other applications, services, processes, systems, engines, or functionality not discussed in detail herein. The fulfillment application 315 is executed in order to facilitate fulfillment tasks within a fulfillment center. For example, the fulfillment application 315 can provide information about one or more tasks performed by workers within a fulfillment center, such as the location of an item that the worker is directed to retrieve. It should be appreciated that while discussion of the fulfillment application 315 is made in the context of fulfillment of orders made by users or customers of an electronic commerce system via a fulfillment center, that the fulfillment application can also facilitate stocking of items in the fulfillment center, or the stowing of items. To this end, the fulfillment application 315 can provide information about the location of a bin within the fulfillment center in which the worker is directed to stow an item that is being stocked.

The data stored in the data store 312 includes, for example, fulfillment data 324. The fulfillment data 324 includes data with which the fulfillment application 315 can facilitate fulfillment of items via a fulfillment center in response to orders that are placed by users or customers of an electronic commerce system. In other words, the fulfillment application 315 can initiate locating, retrieval from a stowage location, packing, and subsequent shipment of an item to a user ordering the item via an electronic commerce system. In one embodiment, the fulfillment data 324 can include a fulfillment center map 327, which contains information about the location of items, bins or other stowage locations in which items can be stored within one or more fulfillment center.

The fulfillment center map 327 can identify one or more bins or stowage locations by an identifier as well as information about where in the fulfillment center the bin and/or stowage location are located. For example, a given bin can be identified by a unique identifier, a floor, row number, shelf number, bin location, or any other information from which a worker and/or robot within a fulfillment center can locate the given bin. Additionally, the fulfillment center map 327 can map location identifiers 108 to specific locations within the fulfillment center 200. The fulfillment application 315, using the fulfillment center map 327, can facilitate the routing of workers within one or more fulfillment centers for efficient fulfillment of orders via the fulfillment centers. The fulfillment application 315 can also determine routes from other points within the fulfillment center 200 to a given location identifier 108, such as from an entry or exit of the fulfillment center 200. The fulfillment application 315 can also calculate routes between two or more location identifiers 108 within the fulfillment center 200.

The fulfillment center map 327 can also include a reference image of various rows or aisles within the fulfillment center along with an image map that maps a particular item location 213 to the reference image. In this way, the location within the image of a particular item location 213 can be determined in relation to other item locations 231 appearing within the image. Accordingly, an image analysis can be performed using the reference image such that a location of a particular item location 213, such as a bin, can be identified in terms of a vector or distance from another item location 213 appearing within the reference image.

Fulfillment data 324 can also include order data 329 from which the fulfillment application 315 can initiate fulfillment of items. Order data 329 can include information about orders placed by users via an electronic commerce system and the fulfillment application 315 can direct a worker and/or robot within a fulfillment center 200 to retrieve the item from a location within the fulfillment center based upon the order data 329. For example, the order data 329 can include information about which items are associated with a particular order, a class of shipping associated with an order (e.g., shipping speed), a class of fulfillment associated with the order (e.g., fulfillment speed), or other information with which the fulfillment application 315 can determine when and how a particular item associated with an order should be retrieved and shipped to a recipient.

Item data 331 includes information about items that are stocked within a fulfillment center. Item data 331 can include information such as product descriptions, specifications, or other information. Item data 331 can also include an item identifier 333 with which the item can be uniquely identified within a fulfillment center in which it is stocked. Item data 331 can also include an item location 335, which can identify one or more locations within a fulfillment center in which an item is stocked. The item location 335 can also identify how many of a particular item are stocked in a given location. Such a location can be identified by one or more of a bin identifier, a floor number, a row number, shelf number, region or other data by which a given location can be identified within a fulfillment center.

The wearable computing device 103 is representative of a plurality of wearable computing devices 103 that may be coupled to the network 309. The wearable computing device 103 may comprise, for example, a processor-based system such as a computer system. Such a computer system may be embodied in the form of augmented reality glasses that project or render a user interface within the field of view of a user wearing or carrying the wearable computing device 103. It should be noted that a wearable computing device 103 can be a device that can be carried by the user as opposed to literally worn by the user. In such a scenario, the wearable computing device 103 may be in communication with another device or display that renders a user interface within the field of view of the user. The wearable computing device 103 may include a display 378. The display 378 may comprise, for example, lenses that are positioned in front of the user's eyes upon which the user interface can be rendered such that the user interface is within the field of view of a user wearing or carrying the wearable computing device 103. Accordingly, the display 378 can comprise a miniaturized projection system that is integrated within the wearable computing device 103 that projects the user interface 105 onto lenses or glasses that are positioned in front of one or more eyes of the user.

The wearable computing device 103 may be configured to execute various applications such as a client application 381 and/or other applications. The client application 381 may be executed in a wearable computing device 103, for example, to access content served up by the computing environment 303 and/or other servers, thereby rendering a user interface 105 on the display 378. The client application 381 can also render a user interface 105 based upon data that is stored or cached within storage or memory of the wearable computing device 103. The wearable computing device 103 may be configured to execute applications beyond the client application 381 such as, for example, other augmented reality applications, mobile applications, messaging applications, social networking applications, photography applications, location based applications and/or other applications.

The wearable computing device 103 can also include an image capture device 383, which can include one or more cameras or image capture devices that can capture imagery and/or video of items within a field of view of the user. In one embodiment, the image capture device 383 can be mounted on a frame of the wearable computing device 103 and aimed toward the wearer's field of view such that it captures imagery of what is located in front of the user's head. The image capture device 383 can be accessed by the client application 381 so that the client application 381 can perform analyses on the imagery captured by the image capture device 383. In some embodiments, the client application 381 can be configured to sample imagery captured by the image capture device 383 to facilitate the rendering of a user interface 105 that is displayed on the display 378.

The wearable computing device 103 can also be configured with wireless communication capabilities such as wireless local area network (WLAN) capability that can be employed to facilitate communications with the computing environment 303 via the network 309. Additionally, the wearable computing device 103 can also be equipped with personal area network (PAN) wireless communications capabilities such as a Bluetooth capability. In any form, the wireless communications capabilities of the wearable computing device 103 can allow the wearable computing device 103 to detect location beacons that are positioned throughout the fulfillment center 200. A location beacon can comprise a device that emits a wireless signal indicating a location within the fulfillment center 200. Such a location beacon can emit a location identifier that can be captured by the wireless communications capabilities of the wearable computing device 103 and in turn by the client application 381.

The wearable computing device 103 can also be equipped with one or more position sensors 385 that can provide information about orientation and/or movement of the wearable computing device 103. For example, position sensors 385 can include accelerometers, altimeters, speedometers, or other sensors that can provide pitch data, yaw data, roll data, velocity, acceleration, or other information related to movement and orientation of the wearable computing device 103. In one embodiment, the wearable computing device 103 can execute an operating system that provides an application programming interface (API) that provides API calls with which the client application 381 can access information about device position and/or orientation or other data obtained by the position sensors 385.

The wearable computing device 103 can also be configured to store map data 387 that can correspond to at least a subset of the fulfillment center map 327. In other words, the wearable computing device 103 can cache information about location identifiers positioned throughout the fulfillment center 200 as well as information about products and/or inventory storage locations 203 that are positioned throughout the fulfillment center 200. In this way, the client application 381 can rely upon cached map data 387 to facilitate the rendering of information in the user interface 105 including worker instructions 107 and/or visual indicators 109 rather than relying upon the fulfillment application 315 executed in the computing environment 303 to provide location information with which the user interface 105 can be created. For example, map data 387 can include reference images of aisles or rows within the fulfillment center 200 that correspond to items that the worker may encounter during a shift or a given period of time so that the client application 381 can perform image analyses on the reference image as compared against imagery captured by the image capture device 383 in order to render or update a visual indicator 109 appearing within a user interface 105.

The wearable computing device 103 can also be configured to store a work queue 389, which can include information about the various tasks associated with a given worker or user assigned to a particular wearable computing device 103. For example, a user may authenticate with the fulfillment application 315 via a login user interface provided by the client application 381 and the wearable computing device 103. The fulfillment application 315 can then transmit information about the various tasks to be performed by the user during a particular shift and/or a given period of time. In such a scenario, the client application 381 can also retrieve and cache map data 387 identifying location information about item locations 231 of the items to be retrieved by the user during the given period of time as well as data regarding location identifiers that are near the item locations 231. In this way, the client application 381 can generate worker instructions 107 and/or visual indicators 109 in the user interface 105 without relying exclusively on data obtained in real time from the fulfillment application 315.

Next, a general description of the operation of the various components of the networked environment 300 is provided. To begin, the fulfillment application 315 can facilitate providing information in the form of a user interface and/or user interface updates that are rendered upon the display 378 of a wearable computing device 103 that provides information about a task for a worker within the fulfillment center 200. For example, such a task can include an instruction to retrieve an item from an item location 213 within the fulfillment center 200 to a sorting/packing area 206. As another example, a task can include an instruction to stow an item in an item location 213 within the fulfillment center 200. Accordingly, a user interface 105 rendered by the wearable computing device 103 can be generated by the client application 381 and/or the fulfillment application 315 that includes a worker instruction 107, a visual indicator 109, and/or information about at least a portion of a task to be completed by the worker.

For example, the worker instruction 107 can include a location of an item that needs retrieval from an item location 213 in the fulfillment center 200 as well as turn-by-turn directions to the item location 213 as determined from the current location of the wearable computing device 103 as determined by the client application 381 in response to detection of a location identifier within the field of view of the wearable computing device 103 that is captured by the image capture device 383. As another example, the worker instruction 107 can also include turn-by-turn directions to an item location 213 and/or a region within the fulfillment center 200 at which an item can be stowed by the worker. Accordingly, as a user wearing a wearable computing device 103 moves throughout the fulfillment center 200, the wearable computing device 103 can capture representations of location identifiers 108 within the fulfillment center 200. These location identifiers can be affixed to the floor of the fulfillment center 200 or other surfaces within the fulfillment center 200. These location identifiers 108 can be captured periodically, such as every few seconds, milliseconds, or other quantum of time.

As the wearable computing device 103 captures these representations, they can be transmitted to the fulfillment application 315. In response to receiving a representation of a location identifier 108, the fulfillment application 315 can determine whether a worker instruction displayed in a user interface 105 should be updated in response to a changed location of the wearable computing device 103. In one embodiment, the fulfillment application 315 can generate turn-by-turn instructions to a destination within the fulfillment center 200 based upon the location of the wearable computing device 103, and the worker instruction 107 and/or visual indicator 109 on the user interface 105 that directs the user as to a direction in which the worker should proceed can be updated as the location of the wearable computing device 103 is updated in the form of location identifiers 108 that are captured by the wearable computing device 103.

Additionally, should a worker proceed too far or pass a destination to which the worker has been directed, the fulfillment application 315 can generate a worker instruction 107 that informs the worker to stop and/or turn around in order to arrive at the destination. In some embodiments, the worker instruction 107 can also include an alert that the worker has arrived at his or her destination, such as a particular item location 213 within the fulfillment center 200. In some embodiments, the client application 381 may alert the worker about an arrival at a destination via a vibration caused by a motor or other tactile/haptic feedback, an audible alert, or a visual alert rendered on the display 378 of the wearable computing device 103.

In some embodiments, the fulfillment application 315 and/or client applications 381 executed by multiple instances of wearable computing devices 103 can generate turn-by-turn instructions to optimize the flow of workers through the fulfillment center 200. In other words, the fulfillment application 315 can direct workers via turn-by-turn instructions according to a route that minimizes collisions with other workers wearing wearable computing devices 103 in the fulfillment center 200.

As shown in the example scenario 100 shown in FIG. 1, the client application 381 can also render a visual indicator 109 in the user interface 105 that can serve various purposes. The visual indicator 109 can highlight or identify an item of interest that is located within the field of view of the user. Such an item of interest may be identified by the wearable computing device 103 via the image capture device 383. The item of interest may comprise, for example, an item location 213 such as a bin, shelf, or item in the fulfillment center 200.

In order to identify an item of interest, the client application 381 can perform an image analysis of imagery captured by the image capture device 383. Items in the fulfillment center 200, such as item locations 231 (e.g., bins, shelves, etc.), can have location identifiers 108 affixed to them, such as a barcode identifier, RFID tag, location beacon, etc. Accordingly, as a user wearing a wearable computing device 103 moves throughout the fulfillment center 200, the client application 381 can periodically capture location identifiers 108 that appear within the fulfillment center 200 via the image capture device 383 and/or wireless capabilities of the wearable computing device 103. In response to capturing a location identifier 108 for which location information can be determined from the map data 387, the client application 381 can render or update a visual indicator 109 in the user interface 105.

For example, if a current task of a user comprises the storage or retrieval of an item from a particular item location 213, a visual indicator 109 can indicate a location within the field of view of the user at which the item location 213 is located. In order to render such a visual indicator 109, the client application 381 performs an image analysis of the field of view by comparing it against a reference image of a particular aisle or row in which the item location 213 is located. Accordingly, even if a location identifier 108 of a particular item location 213 is not visible within the field of view, the image capture device 383 or wireless capabilities of the wearable computing device 103 may be able to capture a location identifier within the field of view of another item location 213 appearing within the field of view.

As noted above, map data 387 or the fulfillment center map 327 can include a reference image of an aisle or row along with an image map that maps the location of item locations 213 in relation to one another. Therefore, the image analysis performed by the client application 381 can determine the location within the field of view of the user by comparing the field of view as captured by the image capture device 383 with the reference image. Accordingly, the visual indicator 109 highlighting a location of an item location 213 within the field of view can be rendered upon the display 378 upon performing such an image analysis. Such an analysis can be performed periodically, such as multiple times per second or any other quantum of time such that the visual indicator 109 is updated as the user moves his or her head or moves throughout the fulfillment center 200.

The visual indicator 109 can also be updated in response to data from the position sensors 385 of the wearable computing device 103. For example, as the user moves his or her head or moves throughout the fulfillment center 200, the client application 381 can update the location of the visual indicator 109 in response to detecting movement from position sensor 385 data. Such data can include orientation data, pitch, yaw, accelerometer data or other data from which the orientation of the wearable computing device 103 can be determined.

In some embodiments, the client application 381 executed by the wearable computing device 103 can be configured to provide worker instructions 107 and/or visual indicators 109 to a worker wearing the wearable computing device 103 who is not moving or navigating throughout a fulfillment center 200. For example, a worker may be positioned in an area of a fulfillment center 200 to which items are brought by robotic devices and/or a conveyor system and where the worker is directed to pack and/or ship items that are brought to the location of the worker. In one scenario, the client application 381 executed by the wearable computing device 103 can capture identifiers that are associated with an item retrieved by the robotic device and consult the fulfillment application 315 and/or the work queue 389 to determine whether the worker instruction 107 and/or visual indicator 109 rendered upon the display 378 should be updated.

In one embodiment, a robotic device can be configured to transmit an identifier to the wearable computing device 103 that uniquely identifies the robotic device with respect to other robotic devices. In response to obtaining such an identifier, the client application 381 can consult the fulfillment application 315 and/or the work queue 389 to determine whether and how to update the worker instruction and/or visual indicator 109. For example, the worker instruction 107 can be updated to instruct the worker as to which item to retrieve from a robotic device arriving within a proximity of the wearable computing device 103.

Figure 4:
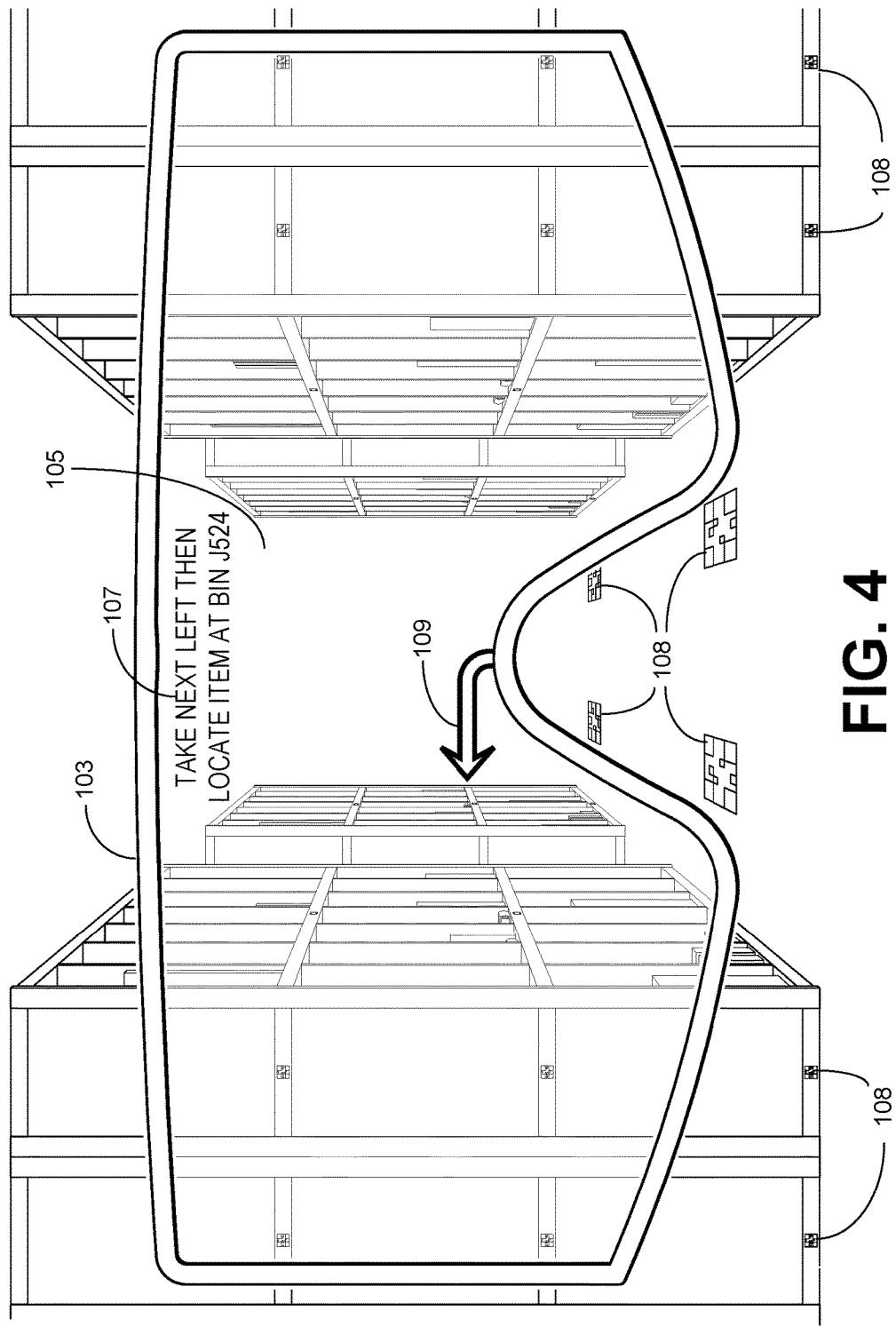
FIG. 4 is a drawing depicting a user interface depicting a user interface element that is rendered and facilitated by embodiments of the present disclosure.

Referring next to FIG. 4, shown is an example of a user interface 105 rendered by a wearable computing device 103 illustrating an example of a worker instruction 107 as well as a visual indicator 109 that can be rendered upon a display 378 of the wearable computing device 103 according to various embodiments of the disclosure. The user interface 105 shown in FIG. 4 includes a worker instruction 107 that is based upon a location determined by the client application 381 in response to capturing a representation of one or more location identifiers 108 appearing within the field of view of the wearable computing device 103. The location identifiers 108 are captured by the image capture device 383 that can be integrated within the wearable computing device 103 or in communication with the wearable computing device 103. In the depicted example, the worker instruction 107 comprises a navigational direction to a destination within the fulfillment center 200 as well as information about a task to be performed by the user. As shown in FIG. 4, the worker instruction 107 comprises an identity of an item location 213 to which the worker should proceed as well as an instruction to retrieve an item that is stored in the item location 213.

The worker instruction 107 can be generated by the client application 381 and be generated based at least in part upon a current location within the fulfillment center 200 of the wearable computing device 103 as determined by the client application 381 and/or the fulfillment application 315. Additionally, the user interface 105 also includes a visual indicator 109 that can provide a visual aid to the worker and that is also rendered upon the display 378 by the wearable computing device 103. In the example shown in FIG. 4, the visual indicator 109 rendered by the client application 381 comprises an arrow indicating a turn-by-turn direction that facilitates navigation to the item location 213 identified by the worker instruction 107.

In this way, the worker instruction 107 and the visual indicator 109 can be generated by the client application 381 based at least in part upon the work queue 389 associated with a particular worker, the location of the wearable computing device 103 within the fulfillment center 200 and the map data 387 that is cached in the wearable computing device 103. In some embodiments, the fulfillment application 315 can generate the worker instruction 107 and visual indicator 109 rather than the client application 381 executed by the wearable computing device 103. In such a scenario, the fulfillment application 315 can transmit the worker instruction 107 and visual indicator 109 to the client application 381 via the network 309, which can be rendered upon the display 378 by the client application 381.

Figure 5:
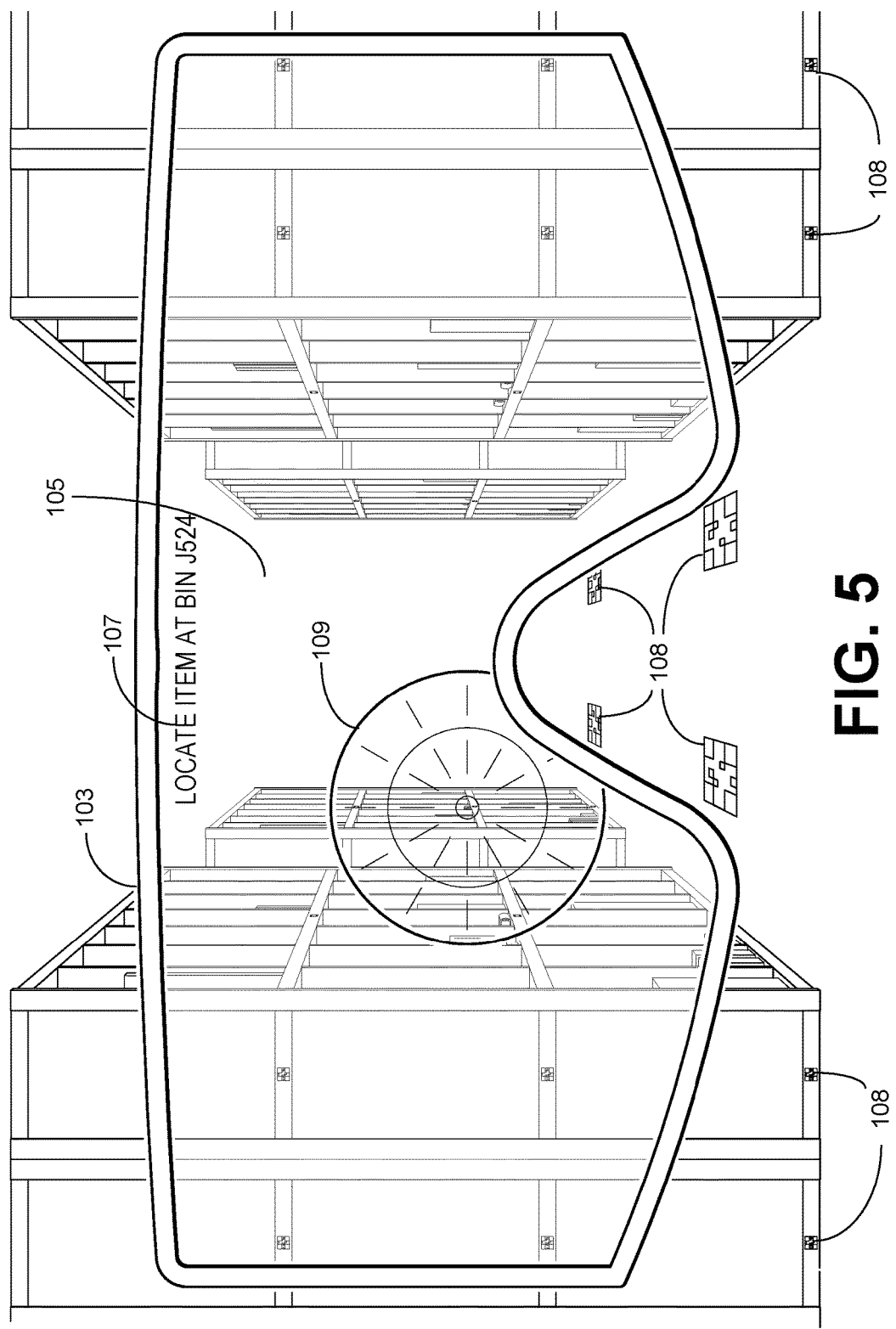
FIG. 5 is a drawing depicting a user interface depicting a user interface element that is rendered and facilitated by embodiments of the present disclosure.

Continuing the example of FIG. 4, reference is now made to FIG. 5, which illustrates an updated user interface 105 rendered by the client application 381 upon the display 378 of the wearable computing device 103. In the example of FIG. 5, the worker instruction 107 is updated based upon an updated location of the wearable computing device 103 as determined by the client application 381 as well as an image analysis performed by the client application 381. As noted above, the client application 381 can perform an image analysis on imagery of the field of view of the user wearing the wearable computing device 103 that is captured by the image capture device 383 of the wearable computing device 103.

In the example of FIG. 5, the visual indicator 109 is overlaid onto a location of the item or item location 213 within the field of view of the user that is associated with a task indicated by the worker instruction 107. As described above, the location of the item within the field of view of the user can be determined based upon an image analysis of the field of view as compared against a reference image of the aisle in which the item or item location 213 is located.

Figure 6:
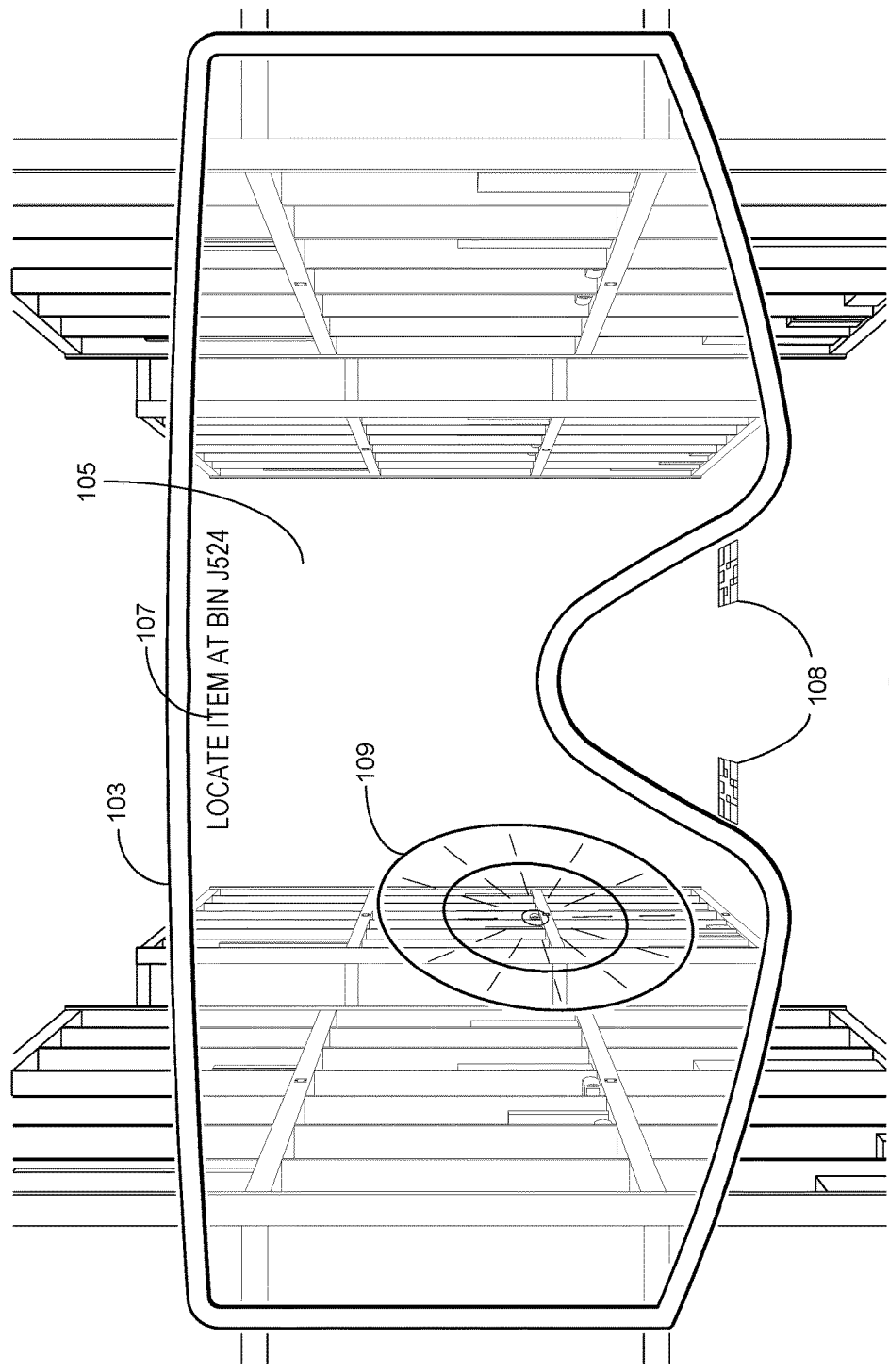
FIG. 6 is a drawing depicting a user interface depicting a user interface element that is rendered and facilitated by embodiments of the present disclosure.

Continuing the example of FIG. 5, reference is now made to FIG. 6. FIG. 6 illustrates an updated user interface 105 in which the visual indicator 109 has been updated based upon an updated location and/or orientation of the wearable computing device 103 relative to the scenario shown in FIG. 5. In the example of FIG. 6, the user has moved forward into the aisle in which the item location 213 specified by the worker instruction 107 is located. Accordingly, the client application 381 can detect the updated location of the wearable computing device 103 by detecting one or more location identifiers 108 appearing within the field of view of the wearable computing device 103. The wearable computing device 103 can then update the visual indicator 109 by capturing location identifiers 108 within the field of view of the user and determining a relative distance from the location identifiers 108 that are visible within the field of view to the item location 213.

In other words, as is described above, the client application 381 can determine a location within the display 378 at which the visual indicator 109 should be placed by performing an image analysis of the field of view of user as reflected in imagery captured by the image capture device 383. The client application 381 can perform such an image analysis periodically, such as multiple times per second, multiple times per millisecond, or any other quantum of time. Additionally, an event based model can be employed where the visual indicator 109 is updated when one or more position sensors 385 indicate that the location and/or orientation of the wearable computing device 103 has changed by more than a threshold amount. In such a scenario, a change in the location or orientation of the wearable computing device 103 by more than a threshold amount indicates that the location of the visual indicator 109 should be updated.

FIG. 6 also illustrates a scenario in which the shape, type and/or orientation of the visual indicator 109 itself can be adjusted based at least in part upon the distance of the wearable computing device 103 from the item location 213 to which the user is being directed by the worker instruction 107 and visual indicator 109. In other words, the visual indicator 109 can be changed depending upon whether the user is relatively close to the item location 213. As shown in FIG. 6, the shape of the visual indicator 109 is changed as the user approaches the item location 213. As one example, the visual indicator 109 can take one form when only a "rough" measure of the location within the field of view is known and another form when a more accurate location of the item location 213 within the field of view can be determined. In this scenario, a rough measure of the position of the item location 213 within the field of view may exist when the location identifier 108 of the item location 213 cannot be seen at all or with enough fidelity to identify within the field of view.

Accordingly, the position of the item location 213 within the field of view in this scenario is determined based upon the relative location of the item location 213 as compared to those location identifiers 108 that can be identified within the field of view. The relative location of the item location 213 as compared to those location identifiers 108 that can be identified within the field of view is determined by performing an image analysis of the field of view as captured by the image capture device 383 of the wearable computing device 103.

Figure 7:
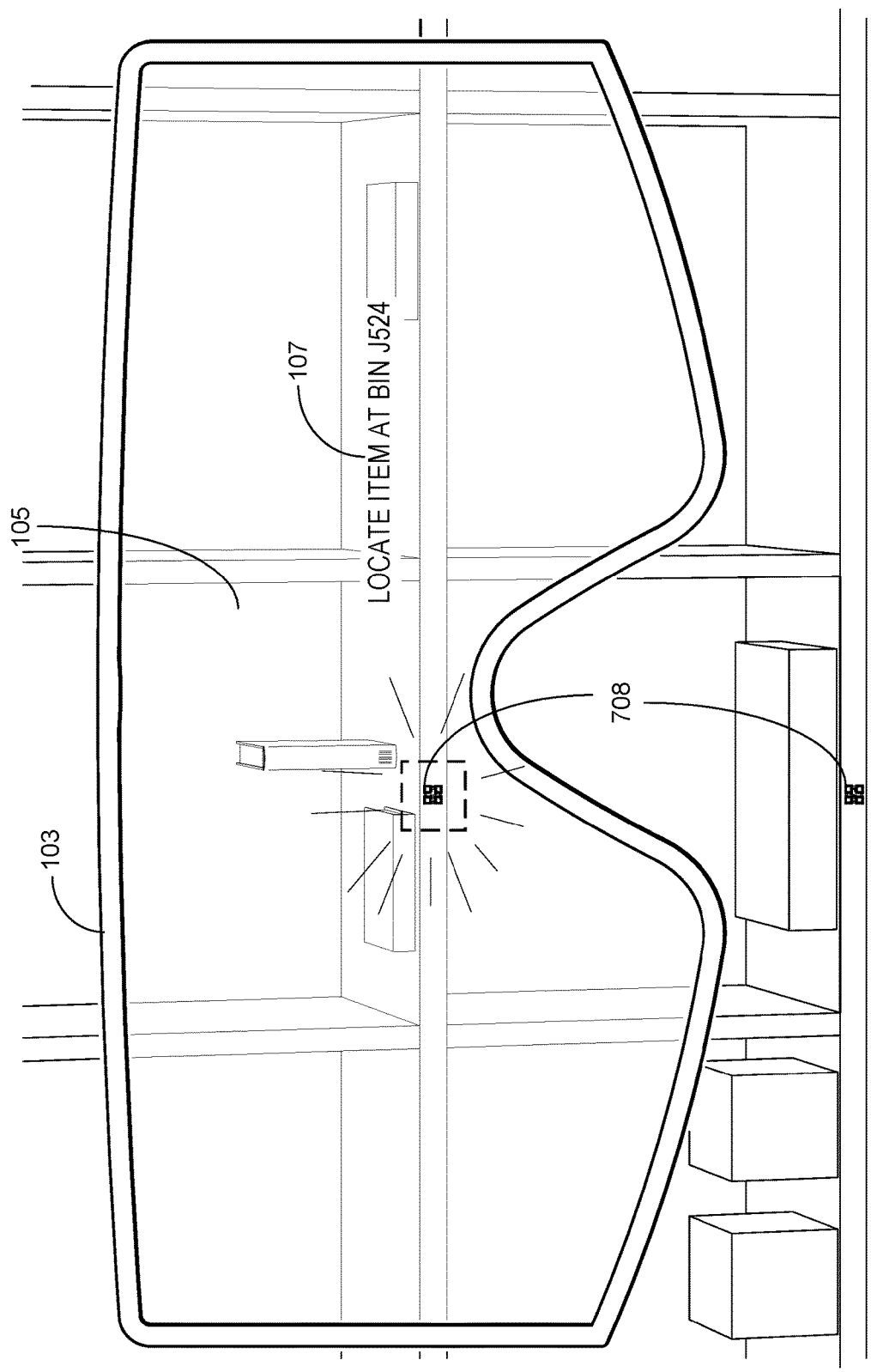
FIG. 7 is a drawing depicting a user interface depicting a user interface element that is rendered and facilitated by embodiments of the present disclosure.

Reference is now made to FIG. 7, which continues the example of FIG. 6. In FIG. 7, the user has approached and found the item location 213 associated with a particular task. In the example shown in FIG. 7, the client application 381 can identify a barcode identifier or other type of identifier associated with the item location 213 to which a particular item to be retrieved by the worker is assigned. Accordingly, as shown in FIG. 7, as the user approaches the item location 213, the client application 381 can identify the location identifier 708 associated with the item location 213 that is associated with the task that the user was tasked with completing. In the example shown in FIG. 7, the location identifier 708 comprises a QR code, but the location identifier 708 can comprise any barcode identifier, textual identifier, or any other identifier that can be captured by the image capture device 383 and/or the client application 381.

Accordingly, once the user has arrived at the specified item location 213, the client application 381 can transmit an indication that the user has arrived at the item location 213 and/or update the work queue 389 to indicate that the user has arrived at the item location 213 associated with a given task assigned to the worker. As noted above, such a task can include retrieval of an item from a particular item location 213 as well as stowage of an item at the item location 213.

Figure 8:
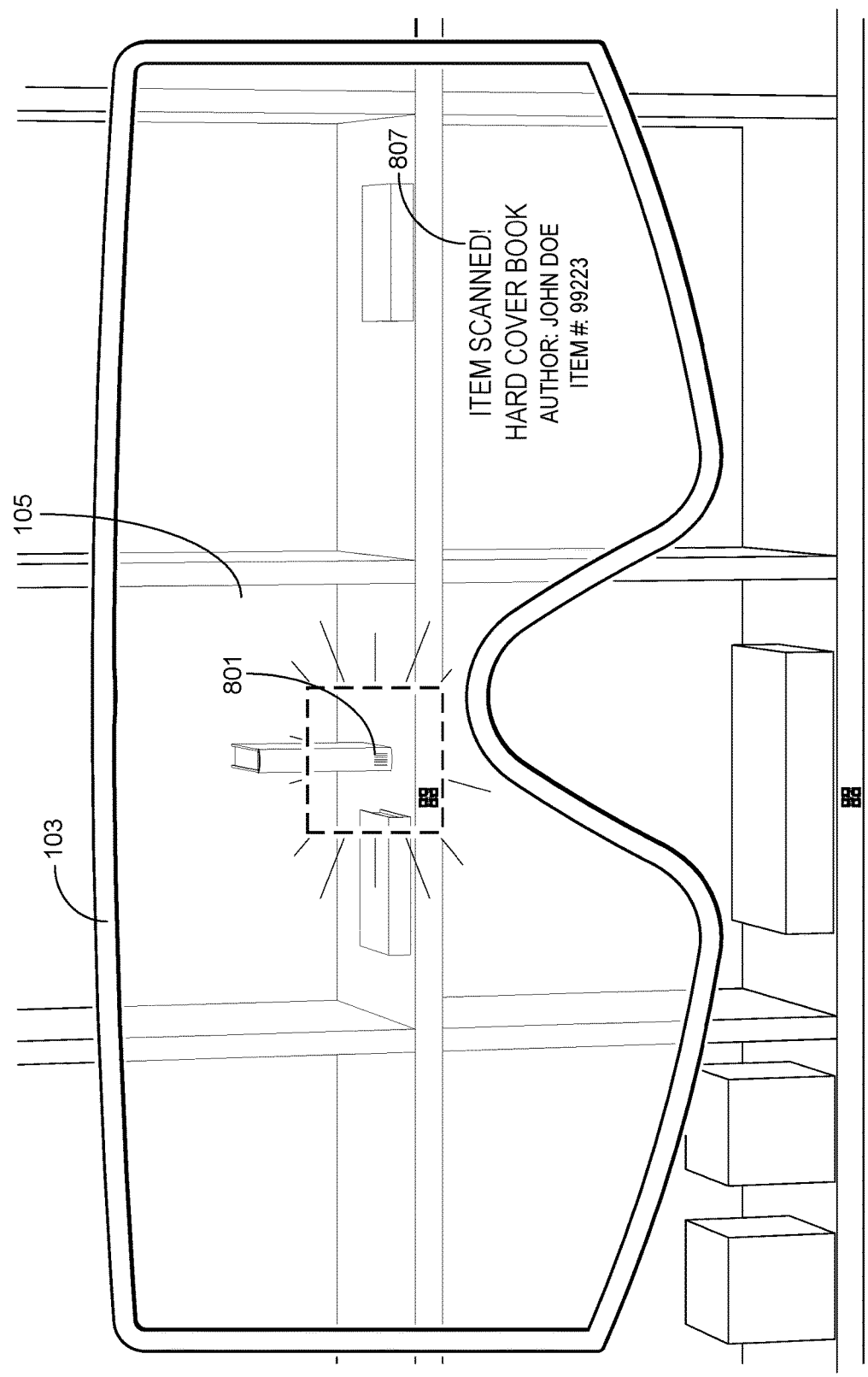
FIG. 8 is a drawing depicting a user interface depicting a user interface element that is rendered and facilitated by embodiments of the present disclosure.

Continuing the example of FIG. 7, reference is now made to FIG. 8, which illustrates an example of how the client application 381 can also identify a barcode identifier 801 associated with a particular item or product stored within the fulfillment center 200. Accordingly, the client application 381 can verify whether the item located in the item location 213 is the item expected to be in the item location 213. Accordingly, the client application 381 can report to the fulfillment application 315 that the item has been retrieved by the worker and/or update the work queue 389 stored in the wearable computing device 103. Additionally, the worker instruction 807 can also be updated by the client application 381 to provide confirmation to the user that the item was identified by the client application 381. In this way, upon confirmation that the item was identified, the user may then place the item in a cart and proceed to a next task in the user's workflow.

Figure 9:
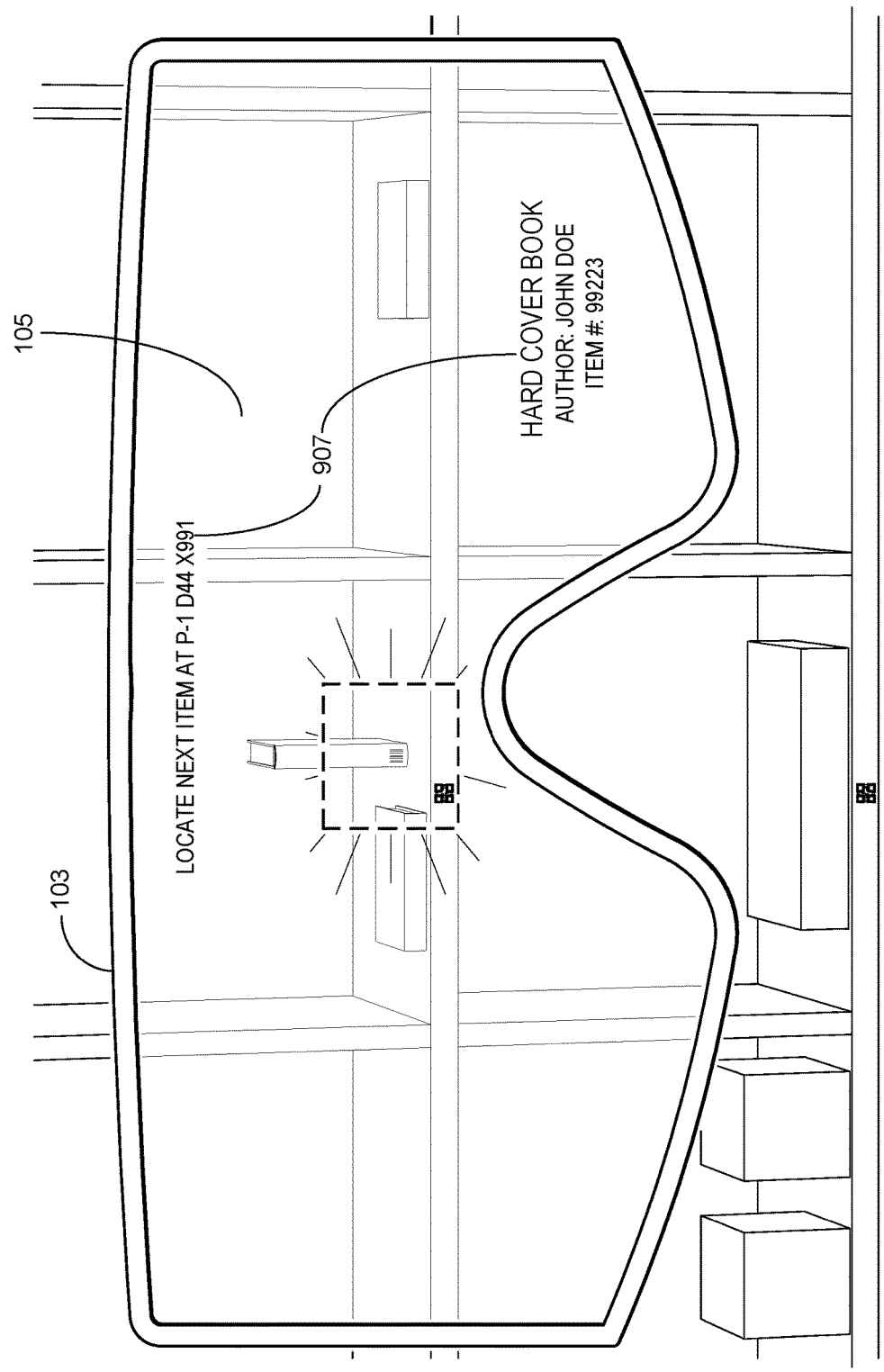
FIG. 9 is a drawing depicting a user interface depicting a user interface element that is rendered and facilitated by embodiments of the present disclosure.

Continuing the example of FIG. 8, reference is now made to FIG. 9, which continues the example of FIG. 8. As shown in FIG. 9, upon confirmation that the item in the item location 213 was scanned by the image capture device 383 of the wearable computing device 103, the client application 381 can update the worker instruction 907 to provide information about a next task to which the worker is assigned. Information about the next task to which the worker is assigned can be retrieved from the work queue 389 and/or from the fulfillment application 315. Such a next task can include, for example, another item that the worker should retrieve from an item location 213, instructions to proceed to another portion of the fulfillment center 200, such as to the sorting/packing area 206.

Figure 10:
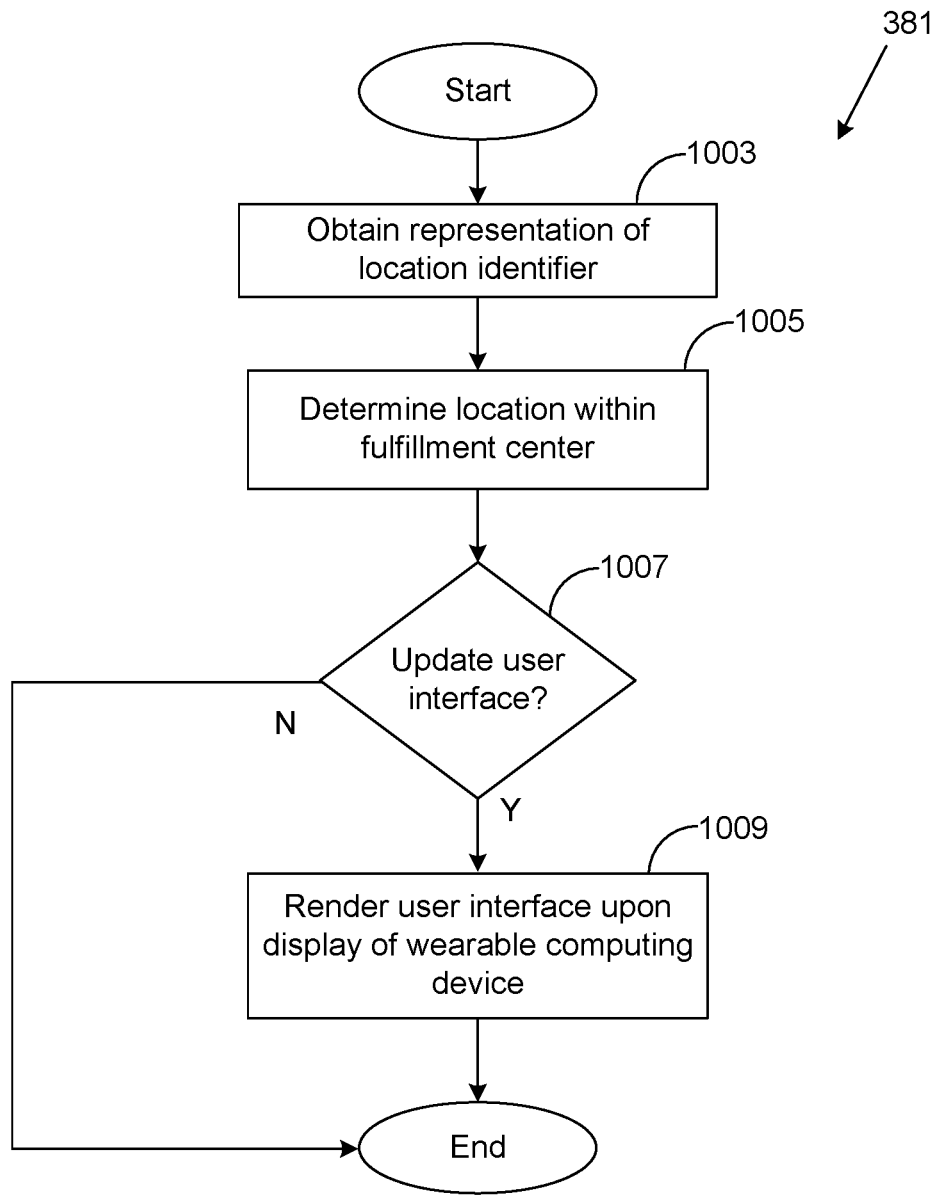
FIGS. 10-12 are flowcharts illustrating one example of functionality implemented as portions of a method according to various implementations of the present disclosure.

Referring next to FIG. 10, shown is a flowchart that provides one example of the operation of a portion of the fulfillment application 315 and/or client application 381 according to various implementations. It is understood that the flowchart of FIG. 10 provides merely an example of the many different types of functional arrangements that may be employed to implement the operation of the portion of the fulfillment application 315 and/or client application 381 as described herein. As an alternative, the flowchart of FIG. 10 may be viewed as depicting an example of steps of a method implemented in the computing environment 303 and/or wearable computing device 103 according to one or more implementations.

Beginning with box 1003, the fulfillment application 315 and/or client application 381 can obtain a representation of a location identifier 108 captured by an image capture device 383 or other capability of a wearable computing device 103 being moved through the fulfillment center 200 by a worker. At box 1005, the wearable computing device 103 can determine its location within the fulfillment center 200 based upon an analysis of the location identifier transmitted to the fulfillment application 315. At box 1007, the client application 381 and/or fulfillment application 315 can determine whether a worker instruction 107 and/or visual indicator 109 in a user interface 105 rendered by the client application 381 should be updated in response to the updated location of the wearable computing device 103.

As noted above, such an updated worker instruction 107 and/or visual instruction 109 can be a turn by turn instruction, the identity of an item to be picked or stowed, or any other instruction that can be updated in response to the location of the wearable computing device 103. At box 1009, the client application 381 can render the updated user interface 105 in response to determining that the user interface 105 should be updated.

Figure 11:
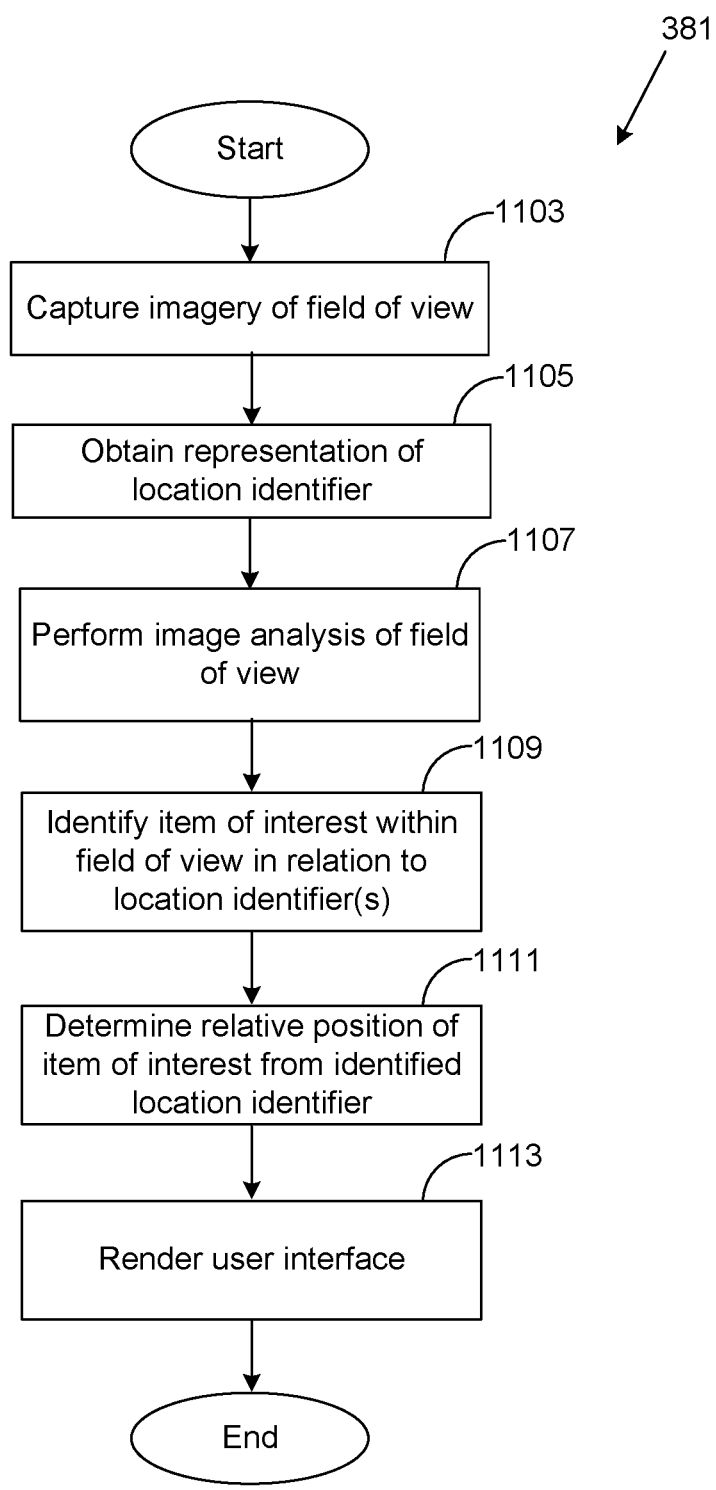

Referring next to FIG. 11, shown is a flowchart that provides one example of the operation of a portion of the client application 381 according to various implementations. It is understood that the flowchart of FIG. 11 provides merely an example of the many different types of functional arrangements that may be employed to implement the operation of the portion of the client application 381 as described herein. As an alternative, the flowchart of FIG. 11 may be viewed as depicting an example of steps of a method implemented in the wearable computing device 103 according to one or more implementations.

At box 1103, the client application 381 can capture imagery of a field of view of the wearable computing device 103 via the image capture device 383 associated with the wearable computing device 103. At box 1105, the client application 381 can obtain a representation of at least one location identifier 108 within the field of view. As noted above, a location identifier 108 may be affixed to various locations within the fulfillment center 200, such as a floor, walls, onto item locations 213, or other positions within the fulfillment center 200. At box 1107, the client application 381 can perform an image analysis of the field of view of the wearable computing device 103 by comparing the field of view to reference images of the location corresponding to the field of view.

At box 1109, the client application 381 can identify an item of interest within the field of view relative to the identified location identifiers within the field of view. The item of interest can correspond to an item location 213, an item, or other location within the fulfillment center 200 that is related to a particular task associated with the user and for which a worker instruction 107 and/or visual indicator 109 is displayed. In some situations, a location identifier 108 identified within the field view corresponds to the particular item of interest corresponding to the worker instruction 107 and/or visual indicator 109. At box 1111, the client application 381 can identify the relative position of the item of interest from identified location identifiers 108 within the user interface 105. At box 1113, the client application 381 can render the user interface 105 including a worker instruction and/or a visual indicator 109.

Figure 12:
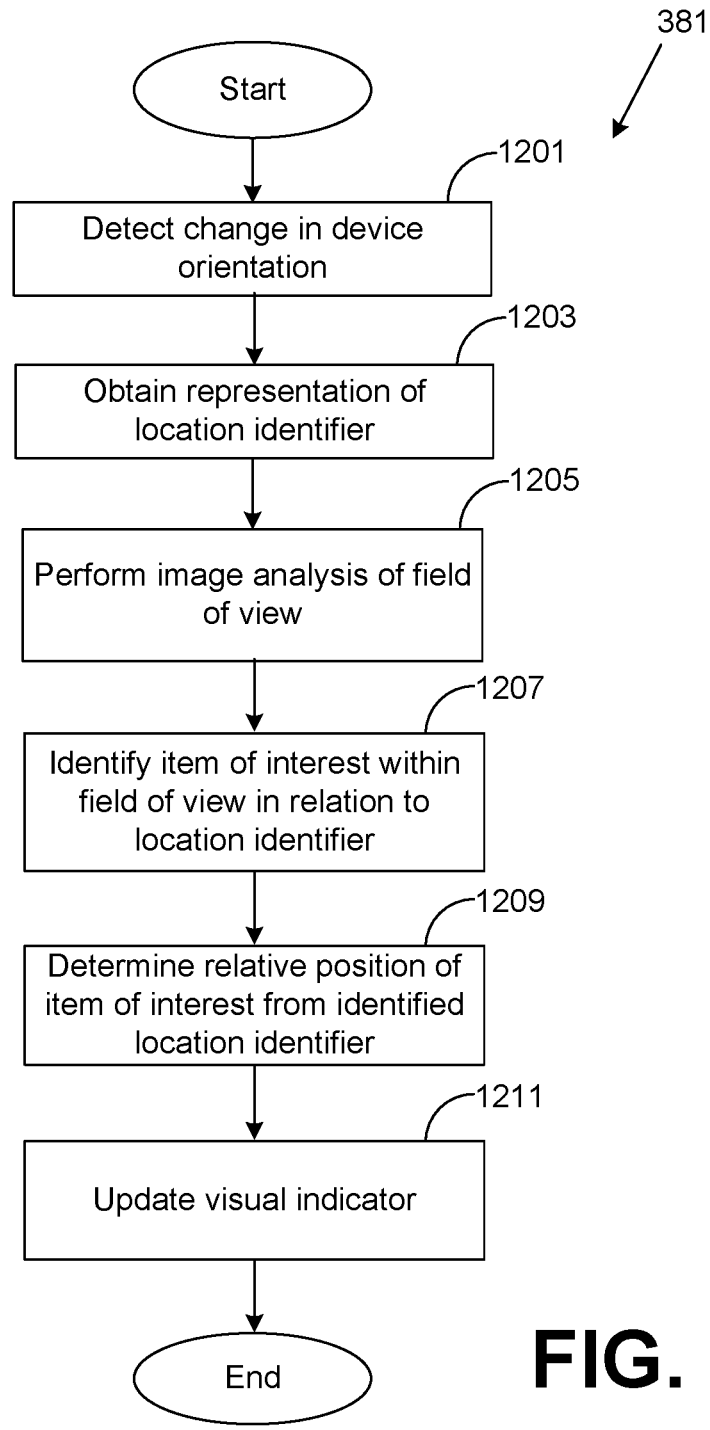

Referring next to FIG. 12, shown is a flowchart that provides one example of the operation of a portion of the client application 381 according to various implementations. It is understood that the flowchart of FIG. 12 provides merely an example of the many different types of functional arrangements that may be employed to implement the operation of the portion of the client application 381 as described herein. As an alternative, the flowchart of FIG. 12 may be viewed as depicting an example of steps of a method implemented in the wearable computing device 103 according to one or more implementations.

At box 1201, the client application 381 can detect a change in the position and/or orientation of the wearable computing device 103 from position sensor 385 data. At box 1203, the client application 381 can obtain a representation of at least one location identifier 108 within the field of view of the wearable computing device 103. As noted above, a location identifier 108 may be affixed to various locations within the fulfillment center 200, such as a floor, walls, onto item locations 213, or other positions within the fulfillment center 200. At box 1205, the client application 381 can perform an image analysis of the field of view of the wearable computing device 103 by comparing the field of view to reference images of the location corresponding to the field of view.

At box 1207, the client application 381 can identify an item of interest within the field of view relative to the identified location identifiers 108 within the field of view. The item of interest can correspond to an item location 213, an item stocked within the fulfillment center 200, or other location within the fulfillment center 200 that is related to a particular task associated with the user and for which a worker instruction 107 and/or visual indicator 109 is displayed. In some situations, a location identifier 108 identified within the field view corresponds to the particular item of interest corresponding to the worker instruction 107 and/or visual indicator 109. At box 1209, the client application 381 can identify the relative position of the item of interest from identified location identifiers 108 within the user interface 105. At box 1211, the client application 381 can render the user interface 105 including a worker instruction and/or a visual indicator 109.

Figure 13:
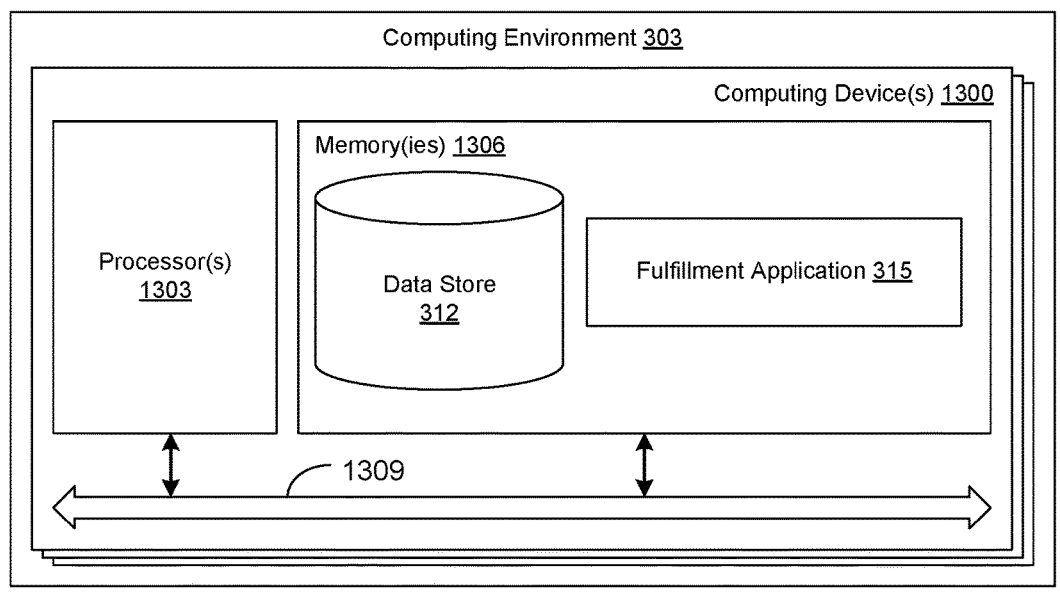
FIG. 13 is a schematic block diagram that provides one example illustration of a computing environment employed in the networked environment of FIG. 3 according to various embodiments of the present disclosure.

With reference to FIG. 13, shown is a schematic block diagram of the computing environment 303 according to an embodiment of the present disclosure. The computing environment 303 includes one or more computing devices 1300. Each computing device 1300 and/or the wearable computing device 103 includes at least one processor circuit, for example, having a processor 1303 and a memory 1306, both of which are coupled to a local interface 1309. To this end, each computing device 1300 may comprise, for example, at least one server computer or like device. The local interface 1309 may comprise, for example, a data bus with an accompanying address/control bus or other bus structure as can be appreciated.

Stored in the memory 1306 are both data and several components that are executable by the processor 1303. In particular, stored in the memory 1306 and executable by the processor 1303 is the fulfillment application 315, and potentially other applications. Also stored in the memory 1306 may be a data store 312 and other data. In addition, an operating system may be stored in the memory 1306 and executable by the processor 1303.

It is understood that there may be other applications that are stored in the memory 1306 and are executable by the processor 1303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1306 and are executable by the processor 1303. In this respect, the term "executable" means a program file that is in a form that can ultimately be run by the processor 1303. Examples of executable programs may be, for example, a compiled program that can be translated into machine code in a format that can be loaded into a random access portion of the memory 1306 and run by the processor 1303, source code that may be expressed in proper format such as object code that is capable of being loaded into a random access portion of the memory 1306 and executed by the processor 1303, or source code that may be interpreted by another executable program to generate instructions in a random access portion of the memory 1306 to be executed by the processor 1303, etc. An executable program may be stored in any portion or component of the memory 1306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1306 is defined herein as including both volatile and nonvolatile memory and data storage components. Volatile components are those that do not retain data values upon loss of power. Nonvolatile components are those that retain data upon a loss of power. Thus, the memory 1306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1303 may represent multiple processors 1303 and/or multiple processor cores and the memory 1306 may represent multiple memories 1306 that operate in parallel processing circuits, respectively. In such a case, the local interface 1309 may be an appropriate network that facilitates communication between any two of the multiple processors 1303, between any processor 1303 and any of the memories 1306, or between any two of the memories 1306, etc. The local interface 1309 may comprise additional systems designed to coordinate this communication, including, for example, performing load balancing. The processor 1303 may be of electrical or of some other available construction.

Although the fulfillment application 315 and client application 381, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 10-12 show the functionality and operation of an implementation of portions of the fulfillment application 315 and/or client application 381. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1303 in a computer system, in the wearable computing device 103 or other system. The machine code may be converted from the source code, etc. If embodied in hardware, each block may represent a circuit or a number of interconnected circuits to implement the specified logical function(s).

Although the flowcharts of FIGS. 10-12 show a specific order of execution, it is understood that the order of execution may differ from that which is depicted. For example, the order of execution of two or more blocks may be scrambled relative to the order shown. Also, two or more blocks shown in succession in FIGS. 10-12 may be executed concurrently or with partial concurrence. Further, in some embodiments, one or more of the blocks shown in FIGS. 10-12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fulfillment application 315 and/or client application 381, that comprises software or code can be embodied in any non-transitory computer-readable medium for use by or in connection with an instruction execution system such as, for example, a processor 1303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including fulfillment application 315 and client application 381, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1300, or in multiple computing devices in the same computing environment 303, or within the wearable computing device 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a wearable computing device configured to execute an application that renders a user interface, the wearable computing device configured to display the user interface in a field of view of a user, the user interface comprising a worker instruction being related to a task in a materials handling facility to be completed by the user, the materials handling facility being configured with a plurality of location identifiers positioned throughout the materials handling facility, individual ones of the plurality of location identifiers corresponding to at least one of a respective location within the materials handling facility or a bin associated with one of a plurality of rows of shelves; and
   wherein the application is further configured to:
      identify one of the plurality of location identifiers using an image capture device or a wireless receiver;
      determine a location of the wearable computing device within the materials handling facility based at least in part on the identification of the one of the plurality of location identifiers;
      receive a robotic device identifier associated with a robotic handling device within a radius of the location of the wearable computing device; and
      update the worker instruction within the user interface in the field of view of the user based at least in part upon the robotic device identifier.

2. The system of claim 1, wherein receiving the robotic device identifier associated with the robotic handling device further comprises receiving the robotic device identifier from the robotic handling device.

3. The system of claim 1, wherein updating the worker instruction within the user interface in the field of view of the user based at least in part upon the robotic device identifier further comprises:
   transmitting the robotic device identifier to a remote computing device; and
   receiving an updated instruction from the remote computing device based at least in part on the robotic device identifier.

4. The system of claim 3, wherein the updated instruction comprises an identity of an item and an instruction for the user to retrieve the item from the robotic handling device.

5. The system of claim 1, wherein the plurality of location identifiers respectively comprise at least one of a barcode identifier placed within the materials handling facility or a wireless transmitter configured to wirelessly emit a location identifier.

6. A method, comprising:
    obtaining, in at least one computing device, a representation of a location identifier corresponding to a location within a fulfillment center of a wearable display device configured to render a user interface within a field of view of a user, the location identifier comprising one of a plurality of location identifiers in the fulfillment center;
    identifying, in the at least one computing device, the location within the fulfillment center corresponding to the location identifier;
    generating, in the at least one computing device, a first update corresponding to the user interface rendered by the wearable display device based at least in part upon the location, the first update comprising a worker instruction associated with a task being performed by the user;
    transmitting, in the at least one computing device, the first update to the wearable display device;
    determining, in the at least one computing device, a robotic device identifier associated with a robotic handling device that is within a radius of the location of the wearable display device; and
    transmitting, in the at least one computing device, a second update to the wearable display device, the second update modifying the worker instruction within the user interface in the field of view of the user based at least in part upon the robotic device identifier.

7. The method of claim 6, wherein the first update further comprises information corresponding to a work queue for the user, the work queue comprising a plurality of tasks to be performed by the user within the fulfillment center.

8. The method of claim 7, wherein the second update modifies the work instruction to include an identity of an item to be retrieved from the robotic handling device by the user.

9. The method of claim 6, wherein the work instruction comprises a destination location of the task to be performed by the user.

10. The method of claim 9, further comprising:
    determining, in the at least one computing device, a route to the destination location associated with the worker instruction in the fulfillment center based at least in part on the location of the wearable display device; and
    wherein the first update comprises the route.

11. The method of claim 10, wherein determining the route to the destination location is further based at least in part on avoiding a respective location of a plurality of other users in the fulfillment center.

12. The method of claim 11, wherein at least one of the other users is using a respective wearable display device that is in communication with the at least one computing device.

13. The method of claim 6, wherein the wearable display device comprises a projection system that projects the user interface.

14. The method of claim 13, wherein the projection system projects the user interface onto a lens or a pair of glasses that are positioned in front of one or more eyes of the user.

15. The method of claim 6, further comprising transmitting, via the at least one computing device, to the robotic handling device an instruction that directs the robotic handling device to a respective location with the fulfillment center.

16. The method of claim 15, wherein the instruction comprises an identity of an item to be retrieved by the robotic handling device at the respective location.

17. A non-transitory computer-readable medium embodying a program executable on at least one computing device, the program causing the at least one computing device to at least:
    obtain a representation of a location identifier corresponding to a location within a fulfillment center of a wearable display device configured to render a user interface within a field of view of a user, the location identifier comprising one of a plurality of location identifiers in the fulfillment center;
    identify the location within the fulfillment center corresponding to the location identifier;
    generate a first update corresponding to the user interface rendered by the wearable display device based at least in part upon the location, the first update comprising a worker instruction associated with a task being performed by the user;
    transmit the first update to the wearable display device;
    determine a robotic device identifier associated with a robotic handling device that is within a radius of the location of the wearable display device; and
    transmit a second update to the wearable display device, the second update modifying the worker instruction within the user interface in the field of view of the user based at least in part upon the robotic device identifier.

18. The non-transitory computer-readable medium of claim 17, wherein the first update further comprises information corresponding to a work queue for the user, the work queue comprising a plurality of tasks to be performed by the user within the fulfillment center.

19. The non-transitory computer-readable medium of claim 17, wherein the second update modifies the work instruction to include an identity of an item to be retrieved from the robotic handling device.

20. The non-transitory computer-readable medium of claim 17, wherein the plurality of location identifiers correspond to at least one of a barcode identifier placed within the fulfillment center or a wireless transmitter configured to wirelessly emit the location identifier.

* * * * *